United States Patent [19]

Savage

[11] 4,186,085
[45] Jan. 29, 1980

[54] SUSPENSION OF POWDERED CARBONACEOUS ADSORBENT IN A HYDROCARBON SOLVENT AND ITS USE IN WASTE WATER TREATMENT

[75] Inventor: David W. Savage, Summit, N.J.

[73] Assignee: Exxon Research & Engineering Co., Florham Park, N.J.

[21] Appl. No.: 866,266

[22] Filed: Jan. 3, 1978

[51] Int. Cl.$^2$ .............................................. C02C 5/02
[52] U.S. Cl. ................................... 210/27; 210/30 R; 210/40; 252/416; 252/439
[58] Field of Search ...................... 210/27, 30 R, 30 A, 210/36, 39, 40; 252/414, 428, 439, 443, 444, 445, 416

[56] References Cited

U.S. PATENT DOCUMENTS

| 2,668,757 | 2/1954 | Hansley | 44/51 |
| 2,754,267 | 7/1956 | Bondi | 252/29 |
| 3,763,040 | 10/1973 | Timpe et al. | 210/40 |
| 3,965,036 | 6/1976 | Himmelstein | 210/40 |
| 4,053,396 | 10/1977 | Trense et al. | 210/40 |

FOREIGN PATENT DOCUMENTS 1304017  1/1973  United Kingdom .

OTHER PUBLICATIONS

Sandall et al., *AICHE Symposium Series*, vol. 70, pp. 144, 1974.
Lowenstein-Lom et al., *Petroleum*, pp. 82-84, Apr. 1947.
Earhart et al., *Chemical Engineering Progress*, vol. 73, No. 5, pp. 67-73, 1977.
Abstract of Japanese application 74/23703.
*Journal of Colloid and Interface Science*, vol. 33, No. 3, pp. 406-420, (1970).
N. B. Godfrey, "Solvent Selection Via Miscibility Number", *CHEMTECH*, pp. 359-363, Jun. 1972.
Puri et al., *Carbon*, vol. 9, pp. 123-134, Pergamon Press, Great Britain, 1971.
Blayden et al., *Carbon*, vol. 5, pp. 533-544, Pergamon Press, Great Britain, 1967.
Arnold et al., *Journal of Physical Chemistry*, vol. 44, pp. 652-670, 1940.
Mill et al., *Analytical Chemistry*, vol. 25, pp. 1390-1393, 1953.
van der Minne et al., *Journal of Colloid Science*, vol. 8, pp. 38-52, 1953.
J. C. Abram, "The Characteristics of Activated Carbon", Proceedings of the Water Research Association Conference, Apr. 1973.

*Primary Examiner*—Thomas G. Wyse
*Assistant Examiner*—Ivars Cintins
*Attorney, Agent, or Firm*—John W. Ditsler; Edward H. Mazer

[57] ABSTRACT

A novel composition is formed by suspending a carbonaceous adsorbent in a branched hydrocarbon solvent. In addition, said powdered carbonaceous adsorbent suspended in a hydrocarbon solvent, preferably a branched hydrocarbon solvent, is an effective adsorbent-extractant for removing both soluble and insoluble organic materials from waste water. Use of this suspension as an adsorbent enables the use of a continuous adsorption process having high capacity for removal of contaminants, fast contaminant removal rates and high adsorbent utilization while permitting easy staged contacting. The spent suspension may then be regenerated by vapor stripping or solvent extraction.

26 Claims, 8 Drawing Figures

SUSPENSION OF POWDERED CARBONACEOUS ADSORBENT IN A HYDROCARBON SOLVENT AND ITS USE IN WASTE WATER TREATMENT

BACKGROUND OF THE INVENTION

1. Field of the Invention

The present invention, in general, relates to a composition comprising powdered carbonaceous adsorbent suspended in a branched hydrocarbon solvent. Additionally, this invention relates to a process for removing organic pollutants comprising predominantly nonbiodegradable organic compounds from waste waters by contacting said waste waters, under adsorption conditions, with a slurry of powdered carbonaceous adsorbent suspended in a hydrocarbon solvent.

2. Description of the Prior Art

The most common method presently employed for removing impurities from waste water includes a primary settling step wherein a major portion of the solids suspended in the waste water is removed with or without the aid of chemical floculating agents followed by a secondary treating step wherein the remaining suspended solids as well as soluble organic material are decomposed by bacteriological action. The effluent from the secondary treating step is then settled to remove the bacteria and the sludge. Thereafter, the clarified effluent is passed into rivers or streams, generally with no further purification, while at least a portion of the sludge is recycled to the secondary treating zone.

This method of biologically treating waste water was developed primarily for the treatment of sanitary or household sewage, which is typically found in a municipal sewer, and has, in general, proven satisfactory provided a high degree of purification is not desired. However, when industrial plants discharge waste waters into municipal sewer systems, serious difficulties may arise since such waste waters often contain a significant amount of nonbiodegradable pollutants and toxic materials. These nonbiodegradable pollutants are not removed from the industrial waste waters and the toxic materials contained therein destroy bacteria in the secondary biological treatment step, thereby rendering the treatment plant inoperable for a period of time while the toxic materials are purged from the system and new bacterial growth re-established. Thus, it is not surprising that relatively large amounts of nonbiodegradable organic compounds may be present in industrial waste waters after the biological secondary treatment. Accordingly, it can be seen that the removal of nonbiodegradable impurities from industrial waste waters may require further treating (for example, with activated carbon) of the effluents from biological secondary treatment plants in order to remove both biodegradable and nonbiodegradable organic contaminants therefrom. Alternatively, it may be desirable to use activated carbon for secondary treatment of the waste waters instead of biological treatment (see, for example, U.S. Pat. Nos. 3,244,621 and 3,455,820, the disclosures of which are incorporated herein by reference).

However, in general, methods of employing conventional activated carbons to remove contaminants from waste water have met with only limited commercial success due to either limited adsorption capability or the high cost of adsorption and regeneration. Also, the high attrition and regeneration losses which occur when activated carbon is employed results in high carbon makeup costs. Conventional activated carbons have the further disadvantage that the adsorbed pollutants are destroyed during regeneration such that they cannot be recovered as a by-product from the process should such be desired.

Usually activated carbon is employed in either granular or powdered form. Activated carbons in powdered form are available at relatively low initial cost since they are produced largely by the partial incineration of waste liquors from paper manufacture. Also, they show faster rates of contaminant removal than the granular form. However, powdered carbon is difficult to use in a continuous process because the powdered carbon is not easily removed from the treated water (due to its highly subdivided state) which results in very low settling rates. In addition, carbon utilization is low relative to granular activated carbon due to the batch contacting.

Granular activated carbons, such as those produced from coal, are expensive adsorbents because they require a multistep process for their manufacture in order to produce them with uniform particle size and acceptable strength and hardness. In addition, the attrition resistance of granular activated carbon is relatively poor and a significant portion of the carbon is lost due to attrition in the handling and use of the material. This may occur, for example, when the spent granular activated carbon is removed from the waste water contacting beds and regenerated, the regenerated carbon then being recycled to the contacting beds. Not only does this represent a high operating cost due to the makeup of the fresh granulated activated carbon, but the fines produced by said attrition are difficult to remove from the treated waste water, and, therefore, represent a source of contamination. Also, waste water treating processes employing granular activated carbon are limited in that it is necessary to inhibit the motion of the carbon granules in order to minimize the attrition of same due to the fragility of the carbon. Furthermore, low rates of contaminant adsorption have been experienced with granular activated carbon relative to powdered activated carbon.

Yet another method for removing contaminants from waste water is by extraction with a hydrocarbon or other solvent (see, for example, Orville C. Sandall et al, *AIChE Symposium Series*, Vol. 70, pp. 144,1974; V. Lowenstein-Lom et al, *Petroleum*, pp. 82–84, April 1974; and J. P. Earhart et al, *Chemical Engineering Progress*, Vol. 73, No. 5, pp. 67–73, 1977, the disclosures of which are incorporated herein by reference). However, solvents have the disadvantage of low capacity for removing dissolved organics from waste waters.

It has also been suggested to transport activated carbon (see japanese application 74/23703, the disclosures of which is incorporated herein by reference) or activated petroleum fluid coke (see U.S. Pat. No. 4,053,396, the disclosure of which is incorporated herein by reference) as a concentrated slurry suspended in water. In addition, suspensions of carbon in paraffinic hydrocarbons (see, for example, *Journal of Physical Chemistry*, Vol. 44, pp. 652–670 [1940]; *Journal of Colloid and Interface Science*, Vol. 33, No. 3, pp. 406–420 [1970], the disclosures of which are incorporated herein by reference) as well as suspensions of carbon in nonparaffinic hydrocarbons (see, for example, *Analytical Chemistry*, Vol. 25, pp. 1390–1393 [1953]; *Journal of Colloid Science*, Vol. 7, pp. 600–615 [1952] *Journal of Colloid Science*, Vol. 8, pp. 38–52 [1953]; U.S. Pat. Nos. 2,668,757 and 2,754,267; British Pat. No. 1,304,017, the disclosures all of which are incorporated herein by reference) have been suggested, but not for treating waste waters.

However, it is believed that none of the foregoing prior art discloses the particular suspension described hereinafter nor its use in waste water treating processes.

SUMMARY OF THE INVENTION

According to the present invention, it has been discovered that a novel composition is formed by suspending a powdered carbonaceous adsorbent in a branched hydrocarbon solvent. Preferably, the composition is fluid and nonaqueous. It has also been discovered that a suspension of said powdered carbonaceous adsorbent in a hydrocarbon solvent, preferably a branched hydrocarbon solvent, is effective in removing organic contaminants from waste waters. The use of an adsorbent comprising a powdered carbonaceous adsorbent slurried in a hydrocarbon solvent gives high capacity for contaminant removal and enables high rates of contaminant adsorption that are characteristic of powdered activated carbon as well as high carbon utilization due to the slurry being contacted with the waste water continuously and countercurrently. The spent slurry of carbonaceous adsorbent may be regenerated by heating at relatively low temperatures followed by vapor stripping or by solvent extraction.

DETAILED DESCRIPTION OF THE INVENTION

Figure 1:
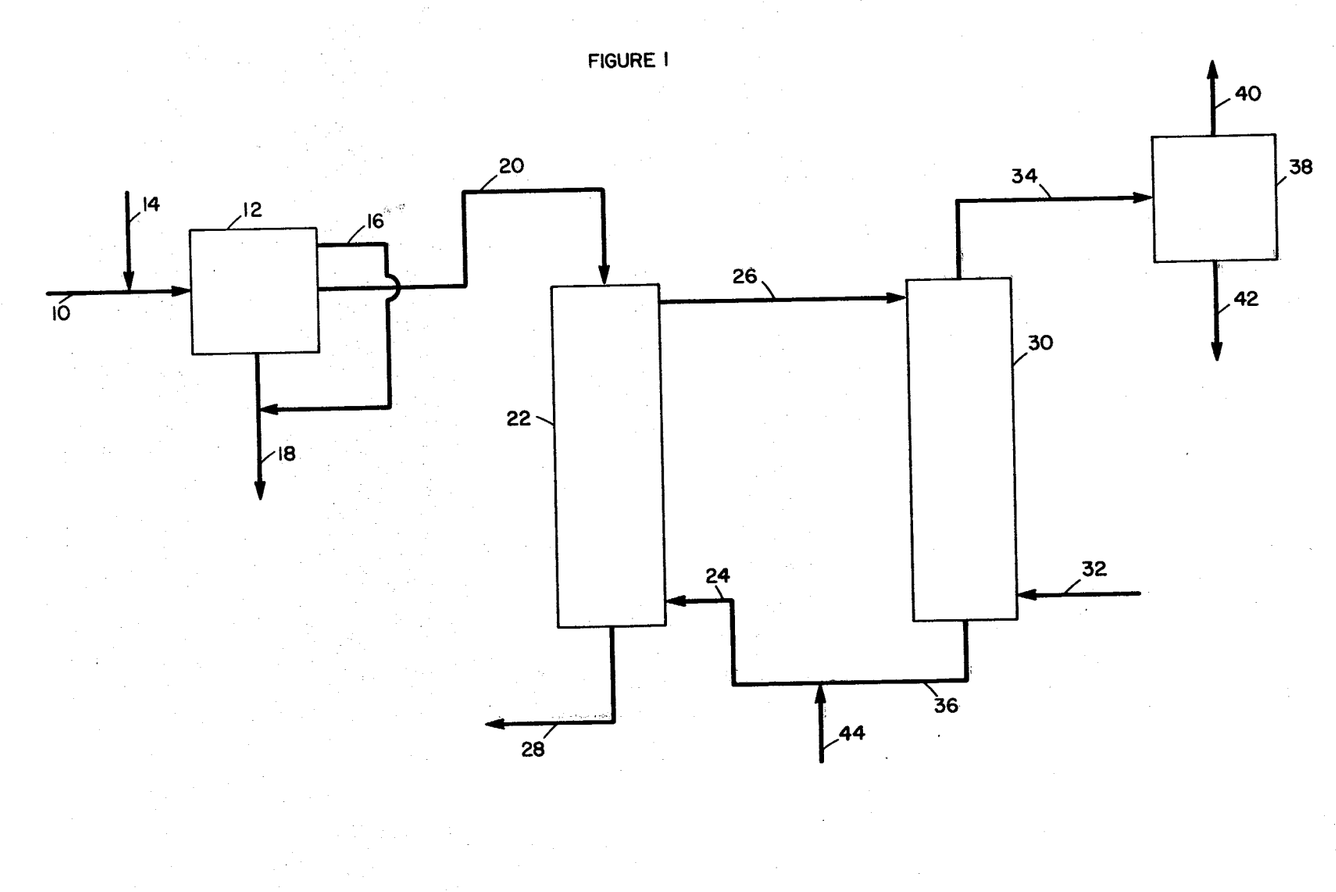
FIG. 1 shows the use of the present invention as an adsorbent in a waste water treating process.

Having thus described the invention in general terms, reference is now made to FIG. 1 which shows the use of the present invention in removing organic contaminants from waste water. Such details are included as are necessary for a clear understanding of how the present invention may be applied to waste water treatment processes. No intention is made to unduly limit the scope of the present invention to the particular configuration shown as variations obvious to those having ordinary skill in the art of waste water treatment are included within the broad scope of this invention.

Referring now to FIG. 1, raw waste water from industrial sources, municipal sources, or mixtures thereof containing organic contaminants is clarified by passage via line 10 into primary separation zone 12. Impurities which are normally present in such waste waters include but are not limited to suspended oil, suspended solid materials, dissolved phenolic compounds, organic acids, alcohols, esters, or other mixtures such as may occur in the waste waters of petroleum refineries, petrochemical plants, coal liquefaction and coal gasification plants, paper mills, food processing plants or miscellaneous manufacturing and industrial plants.

The amount of organic contaminants present in the waste water is not critical to the practice of the present invention and may range broadly, depending upon various process and economic factors such as the amount of adsorbent employed, the degree of purification desired, the frequency of adsorbent regeneration, the size of the contacting zone, and the like. Usually, the amount of contaminants in waste water is expressed in terms of the Chemical Oxygen Demand (COD), which is the quantity of oxygen (in milligrams per liter or parts per million) consumed under specific oxidation conditions with strong chemical oxidizing agents such as sodium chromate (see *Method for the Examination of Water and Waste Water*, 12th Edition, Public Health Association, New York, New York (1965), pp. 510–514, the disclosure of which is incorporated herein by reference). Typically, the COD of such waste waters will range from about 100 to about 2000 milligrams per liter, in some cases will range from about 100 to as high as 5000 or 6000 milligrams per liter or more. However, such specific amounts are merely representative and should not be considered as limiting the effectiveness of the present invention in removing contaminants from waste waters.

In pretreatment zone 12, the raw waste water is subjected to gross removal of the suspended impurities (e.g. oil and other suspended solids) present therein. Preferably, material which does not pass an 0.45 micron Millipore filter is removed to a concentration of less than 25 weight parts per million, more preferably less than 15 weight parts per million. The pretreatment processes which may be employed can vary over a wide range and include, but are not limited to, the following: dissolved air flotation, sedimentation, solids-contact clarification, and granular media filtration. The preferred pretreatment process for reducing suspended material to less than 15 weight parts per million comprises granular media filtration, for example, dual-media filtration. If desired, a coagulant can be added to the raw waste water via line 14 to aid in the removal of the suspended materials. Suitable coagulants include alum, lime, activated clay as is disclosed in U.S. Pat. No. 3,487,928 (the disclosure of which is incorporated herein by reference), polyacrylonitrile, sulfonated polystyrene, and the like. Should a coagulant be needed, activated clay is preferred. Typically, 1 to 50 wppm, preferably 1 to 30 wppm, of the coagulating agent is added to the raw waste water.

Normally, the raw waste water is allowed to remain in zone 12 for 30 to 90 minutes in order to permit the suspended solids to settle. Flotable oil and other insoluble materials are removed from the top of the primary separator by conventional means, such as a rotating skimming device, and withdrawn via line 16. Sludge, which is composed of solid particles in the waste water such as salt, fibers, tar and the like, settles to the bottom of the primary separation zone 12 and is removed via line 18. Generally, ambient conditions of temperature and pressure are employed in zone 12.

The pretreated waste water from zone 12 (from which a major portion of the suspended solids has been removed) is then passed via line 20 into contacting zone 22 and contacted therein with a powdered carbonaceous adsorbent slurried in a hydrocarbon solvent to remove at least a portion of the dissolved organic materials present in said effluent. Since it is often difficult to remove all the suspended solids or oil present in the raw waste water in the primary separation zone, contacting the effluent from the primary separation zone with the slurry serves to remove the remaining suspended solids and oils efficiently and thoroughly.

The particular hydrocarbon solvent employed for slurrying the powdered adsorbent is not critical and can range broadly. However, it is preferred that the hydrocarbon solvent have a Miscibility Number of at least 25. A discussion of Miscibility Number may be found in an article by Norman B. Godfrey, "Solvent Selection Via Miscibility Number," *CHEMTECH* pp. 359–363, June 1972, the disclosure of which is incorporated herein by reference. Examples of suitable hydrocarbon solvents (and their Miscibility Numbers) include, but are not limited to, those shown in Table 1 below:

TABLE 1

| Hydrocarbon Solvent | Miscibility Number |
| --- | --- |
| sec-Amylbenzene | 25 |
| 4-Vinylcyclohexane | 26 |
| 1-Methylcyclohexane | 27 |
| Cyclohexane | 26 |
| Heptane | 29 |
| Tetradecane | 30 |
| Petrolatum | 31 |
| 1-Decene | 29 |
| Tripropylamine | 26 |
| 2,2,4-trimethylpentane | 29 |
| 2,2,4-trimethyl-1-pentene | 27 |
| Triisobutylene | 29 |
| Triethylamine | 26 |
| Tributylamine | 28 |
| 1-Tetradecene | 29 |
| Tetrachloroethylene | 25 |
| Pentyl ether | 26 |
| 1-Octene | 28 |
| 1-Octanethiol | 26 |
| 1-Octadecene | 30 |
| Mineral spirits | 29 |
| 4-Methyl-1-pentene | 28 |
| Metyl oleate | 26 |
| Methyl cyclohexane | 29 |
| Kerosene | 30 |
| Di-iso-propylbenzene | 25 |
| Didecyl phthalate | 26 |
| 1,2-dibutoxyethane | 25 |
| Decalin | 29 |
| Coconut oil | 29 |
| Butyl oleate | 28 |
| Butyl ether | 26 |
| 1-Bromotetradecane | 29 |
| 1-Bromooctane | 26 |

Thus, the hydrocarbon solvent used to slurry the powdered carbonaceous adsorbent may be selected from a wide variety of hydrocarbons (including branched hydrocarbons, linear hydrocarbons, cyclic hydrocarbons, aromatic hydrocarbons or mixtures thereof) provided the solvent has a Miscibility Number of at least 25.

It is particularly preferred, however, that the hydrocarbon solvent be characterized in having a low adsorptivity (i.e., low binding energy) on the carbonaceous adsorbent and high capacity for the organic contaminants in the waste water as well as low solubility and low entrainment in water. By way of illustration, a comparison of literature values for certain properties of various hydrocarbon solvents is presented in Table 2 below.

TABLE 2

| Hydrocarbon Solvent | Heat Adsorption, kcal/mole | Water Solubility, wppm | Density Difference vs Water, g/cc. |
| --- | --- | --- | --- |
| 2,2 dimethylbutane | 8.0 | 18 | 0.35 |
| cyclohexane | 8.7 | 55 | 0.22 |
| n-hexane | 10.4 | 10 | 0.34 |
| benzene | 9.8 | 1780 | 0.12 |

From the above table, it can be seen that branched hydrocarbons are the most preferred solvents since they have low solubility in water as well as the lowest adsorption on carbon and the lowest entrainment in water. In contrast, aromatic hydrocarbons are the least preferred solvent, with cyclic hydrocarbon (e.g., cycloparaffins) being intermediate. Linear hydrocarbons (e.g., linear paraffins) are more preferred than the cyclic and aromatic hydrocarbons.

In addition, the hydrocarbon solvent should have a molecular weight such that the impurities in the waste water, after extraction-adsorption into the slurry, can be separated readily from the solvent by stripping or distillation. Thus, it is preferred that the solvent have a normal boiling point at a temperature significantly higher or significantly lower (e.g. about 30° F. or more) than the normal boiling range of the impurities. Preferably, the molecular weight of the solvent should be relatively high (e.g., at least 100) to minimize the solubility of the solvent in water.

As noted above, the hydrocarbon solvent employed in the slurry is most preferably a branched hydrocarbon. By branched hydrocarbon is meant a hydrocarbon having at least one tri-substituted carbon atom, at least one tetrasubstituted carbon atom, or mixtures thereof. By tri-substituted carbon atom is meant a carbon atom that is bonded to three other carbon atoms, e.g., For example, in the case of heptane, heptanes having tri-substituted carbon atoms include 2-methylhexane; 3-methylhexane; 2,3-dimethylpentane; 2,4-dimethylpentane; and 3-ethylpentane. Similarly, a tetra-substituted carbon atom is a carbon atom that is bonded to four other carbons, e.g., Heptanes having tetra-substituted carbon atoms include 2,2-dimethylpentane and 3,3-dimethylpentane. The heptane 2,2,3-trimethylbutane contains both tri-substituted and tetra-substituted carbon atoms. Branched hydrocarbons having at least one tetra-substituted carbon atoms are preferred.

Only a portion of the branched hydrocarbon solvent molecule need be branchy in order to practice the present invention. For example, hydrocarbons of the form RX where R is a branchy group and X is a non-branchy group can be suitably employed. Thus, hydrocarbon solvents such as tetrabutyl benzene can be suitably employed. Similarly, the hydrocarbon solvent (preferably the branched hydrocarbon solvent) can contain other than carbon-hydrogen bonds. For example, branched hydrocarbon solvents containing oxygen, sulfur and nitrogen can also be suitably employed in the present invention. Examples of such branched hydrocarbons include di-isopropyl ether, di-t-butyl ether and t-butyl amine. Among hydrocarbon solvents containing oxygen, sulfur or nitrogen groups, the preferred solvents are those having the branched hydrocarbon group immediately adjacent to the oxygen, sulfur or nitrogen atom (for example t-butyl amine). Thus, the branched hydrocarbon solvent employed herein may be selected from a wide variety of hydrocarbons, provided that it contain at least one tri-substituted carbon atom, at least one tetra-substituted carbon atom or mixtures thereof.

The particular carbonaceous adsorbent employed in the present invention may be virtually any powdered carbonaceous adsorbent that is available in the marketplace and can effect removal of dissolved contaminants from waste waters. Examples of suitable carbonaceous adsorbents include activated carbons such as those sold under the brand names of Filtrasorb, Nuchar, Hydrodarco and the like. Several other activated carbons that can be suitably employed herein include those shown in Table 1 of a paper presented at a Water Research Association Conference in April, 1973 by J. C. Abram and entitled "The Characteristics of Activated Carbon," the disclosure of which is incorporated herein by reference. Other powdered carbonaceous adsorbents that can be suitably used include synthetic polymeric adsorbents such as styrene-divinylbenzene polymers and synthetic carbonaceous adsorbents such as the Ambersorb materials.

Powdered nonstoichiometric carbon-sulfur compounds ($C_xS$) can also be employed as the powdered carbonaceous adsorbent. $C_xS$ may be prepared by a variety of techniques including reacting a carbonaceous material at elevated temperatures (e.g., between say 400° and 700° C.) with a sulfur-containing gas such as $H_2S$, $SO_2$, S and the like (see H. E. Blayden and J. W. Patrick, *Carbon*, Vol. 5, pp. 533–544, Pergamon Press Ltd., Great Britain, 1967; and B. R. Puri and R. S. Hazra, *Carbon*, Vol. 9, pp. 123–134, Pergamon Press, Great Britain, 1971; the disclosures of which are incorporated herein by reference). Suitable carbonaceous materials from which $C_xS$ may be prepared include coal chars, conventional activated carbons, petroleum fluid coke, sucrose, char, and various polymeric chars, (e.g., polyvinylidene difluoride char) and the like. The value of x is not critical and may range broadly, e.g., from about 50 to about 4, which corresponds to from about 5 to about 40 wt. % sulfur. Preferably x will range between about 10 and about 4, which corresponds to from about 20 to about 40 wt. % sulfur. Also, the value of x need not be an integer. $C_xS$ may be characterized as a surface compound of carbon with variable composition and no crystallinity. $C_xS$ is very stable (the sulfur being chemically bound) and is inert to acid, base and organic solvents—an exception being highly concentrated nitric acid.

The particular carbonaceous adsorbent employed in the present invention should have a surface area of at least 300, preferably at least 500, square meters per gram as measured by the Brunauer-Emmett-Teller equation for physical adsorption of nitrogen (i.e., the BET test). Normally the surface area will range from 300 to about 2500, preferably between about 500 and about 1400, square meters per gram. The carbonaceous adsorbent should have a pore volume of at least 0.2, preferably at least 0.5, and more particularly at least 1.0, cubic centimeters per gram. Typically, the pore volume will range from about 0.3 to about 1.2 cubic centimeters per gram.

Although not critical to the practice of the present invention, the particle size of the carbonaceous adsorbent is important in promoting slurry stability, i.e. maintaining the adsorbent in the hydrocarbon solvent. For example, very fine (or very large) particles of adsorbent are difficult to maintain in the hydrocarbon solvent such that they may pass into the water thus containing same. To avoid and/or minimize this undesirable result, it is preferred that the particle size range from about 325 to about 25, preferably from about 140 to about 50, Tyler screen mesh.

In addition, the hydrophobic/hydrophillic character of the surface of the carbonaceous adsorbent is believed to be a factor influencing slurry stability. For example, preferred carbonaceous adsorbents are those having a contact (or wetting) angle of about 0 degrees with the hydrocarbon solvent and greater than 90 degrees with water. Theoretically an adsorbent having a non-polar, aliphilic surface is most preferred. Contact angle can be measured according to the technique described in *Emulsion Science* edited by Philip Sherman, pp. 198–199, Academic Press, New York, 1968, the disclosure of which is incorporated herein by reference.

The amount of carbonaceous adsorbent employed in the slurry is not critical and may range broadly depending on various process and economic factors, provided the amount is effective in removing dissolved contaminants from waste water. For example, if too much adsorbent is employed relative to the amount of solvent, the slurry will become viscous and difficult to handle in a continuous process. Conversely, if too little adsorbent is present, the slurry capacity for contaminants will be low and effective removal of organic contaminants from the waste water will not be obtained in a reasonable time. Therefore, in general, it is preferred that the slurry comprise from about 10 to about 50 wt. %, more preferably from about 20 to about 40 wt. %, carbonaceous adsorbent based on total weight of the slurry.

Returning again to FIG. 1, the slurry of carbonaceous adsorbent is shown being introduced into the lower portion of contacting zone 22 via line 24 and passing upwardly therethrough, countercurrently contacting the waste water being introduced into the upper portion of contacting zone 22 via line 20. Typically, the waste water is passed through contacting zone 22 at a rate of from about 1 to about 10 gpm/sq.ft., preferably from about 4 to about 8 gpm/sq.ft. The rate at which the slurry is introduced into the contacting zone depends upon the amount of impurities to be removed from the waste water and on the rate of the waste water feed.

The temperature within contacting zone 22 is not critical and is normally within the range of from about 40° to about 200° F., preferably from about 50° to 150° F. Similarly, the pressure is not a critical variable and will vary depending upon the volatility of the hydrocarbon solvent. Typically, the pressure will range from 0 to about 200 psig. However, it is preferred that the pressure be maintained at or near atmospheric conditions. The residence time of the waste water in the contacting zone varies depending upon the degree of purification desired, but normally ranges from about 2 to about 60 minutes.

As the waste water enters contacting zone 22, it is first exposed to the exhausted carbonaceous adsorbent which serves to remove residual suspended solids and oils present therein by physical dissolution. These solids and oils are removed from the top of zone 22 via line 20 along with the spent slurry. As the water proceeds downward through the slurry, it comes in contact with progressively less exhausted carbonaceous adsorbent, until near the bottom of zone 22 it is in contact with the freshest adsorbent, thereby resulting in the highest degree of removal of dissolved organic materials from the treated water leaving the bottom of zone 22. Contacting zone 22 may be any apparatus that can be suitably employed to effect absorption from a liquid into a slurry. For example, a conventional liquid-liquid extraction column or a number of mixer-settler units could be employed.

While not wishing to be bound by a particular theory, it is believed that the dissolved organic contaminants in the waste water are extracted into the hydrocarbon solvent and adsorbed by the carbonaceous adsorbent in preference to the weakly adsorbed hydrocarbon. Accordingly, an effluent stream of water having a reduced amount of dissolved organic contaminants is withdrawn and/or recovered from zone 22 via line 28. Preferably, a major portion of the dissolved organic contaminants are extracted from the waste water. Most preferably, the effluent is substantially depleted in dissolved organic contaminants. By substantially depleted is meant that at least 80%, preferably at least 90%, more preferably at least 95% of the dissolved organic contaminants present in the waste water entering contacting zone 22 are removed therefrom.

During contact with the waste water, the carbonaceous adsorbent removes at least a portion, and preferably, substantially all of the dissolved organic contaminants (as well as the remaining suspended oils, etc.) present therein by adsorption such that said adsorbent becomes spent (i.e. a major amount of its adsorptive capacity becomes exhausted) and must be regenerated for further use. However, the particular point at which the slurry is considered to be spent depends not only on its ability (i.e. capacity) to remove organic contaminants, but also on economic considerations. For example, it may be desirable to regenerate a slurry whose adsorptive capacity is only mildly reduced to essentially fresh adsorptive capacity rather than allow its adsorptive capacity to be reduced to a much lower lever and then be regenerated to fresh or less than fresh adsorptive capacity. Therefore, as used herein, the terms "regeneration" or "regenerated" mean recovering a slurry of carbonaceous adsorbent that possesses greater capacity to adsorb organic contaminants than that possessed by the slurry removed from the waste water treatment process.

While the carbonaceous adsorbent maybe regenerated ex situ, in situ regeneration is shown in FIG. 1. Accordingly, in one embodiment, the spent slurry is passed from contacting zone 22 via line 26 into regeneration zone 30 and is contacted therein with a stripping gas introduced into the lower portion of zone 30 via line 32. Since an excess of the hydrocarbon solvent relative to carbonaceous adsorbent is present, the organic contaminants are desorbed or displaced from the adsorbent by the solvent and then stripped therefrom. Preferably, the stripping gas will have a normal boiling point below that of the organic contaminants to facilitate separation of the stripping gas from the desorbed contaminants. It is also preferred that the stripping gas be inexpensive, stable during regeneration, and not reactive with the adsorbent or materials of construction. Suitable stripping vapors include steam, light hydrocarbon gas ($C_1$-$C_4$), inert gas (e.g. nitrogen) and the like. Steam is a preferred stripping vapor.

The stripping should be effected at temperatures ranging from about 70° to about 1200° F., preferably from about 300° to about 700° F. If the heat of adsorption of the hydrocarbon solvent is lower than that of the contaminants, higher temperatures will tend to increase the effectiveness of the stripping gas in displacing the adsorbate. The pressure in the regeneration zone is not critical and will normally vary between about 0 and 200 psig, preferably between 0 and 50 psig. The contact or residence time required need only be that sufficient to obtain a regenerated slurry, i.e. a slurry that possesses a greater capacity to adsorb organic contaminants from waste water than that possessed by the spent slurry. Thus, the contact time may vary from about 1 minute to 2 hours or more. Typically, it will range from about 1 to about 15 minutes.

The stripping vapor plus desorbed contaminants are removed from the regeneration zone 30 via line 34, while the regenerated slurry of carbonaceous adsorbent is removed from the lower portion of the regeneration zone via line 36. The stripping vapor and desorbed contaminants may then be separated by passage into a separation zone 38 (say a fractionation zone) such that the stripping vapor will be recovered overhead in line 40 and the desorbed contaminants recovered via line 42. If desired, the stripping vapor can be recycled to the regeneration zone via line 32.

Another method of regenerating the spent slurry is to extract the desorbed or displaced contaminants from the hydrocarbon solvent using a second liquid solvent (referred to hereinafter as regeneration solvent) which may be introduced into regenerating zone 30 via, say, line 32 (rather than stripping gas). The particular regeneration solvent employed (as with the hydrocarbon solvent used in slurrying the carbonaceous adsorbent) is not critical. However, the regeneration solvent should be immiscible in the hydrocarbon solvent and have a greater affinity for the adsorbate than does said hydrocarbon solvent. Preferred regeneration solvents are those having a Miscibility Number of about 5 or less. For example, the Miscibility Number can range from about 1 to about 5. Examples of suitable regeneration solvents include, but are not limited to those shown in Table 3 below.

TABLE 3

| Regeneration Solvent | Miscibility Number |
|---|---|
| Glycerol | 1 |
| Ethylene glycol | 2 |
| 1,4-Butanediol | 3 |
| 2,2'-Thiodiethanol | 4 |
| Diethylene glycol | 5 |
| 2-Aminoethanol | 2 |
| 3-Chloro-1,2-propanediol | 4 |
| Diethanolamine | 1 |
| Glycerol carbonate | 3 |
| 2,5-Hexanediol | 5 |
| Triethanolamine | 2 |

Most preferred regeneration solvents are glycerol, ethylene glycol, 1,4-Butanediol or mixtures thereof.

Regeneration via solvent extraction should be effected under conditions such that the hydrocarbon solvent and the regeneration solvent will be maintained in substantially the liquid phase. This will, of course, depend on the boiling point of the solvents at the regeneration pressure employed as well as various economic considerations. Typically, regeneration via solvent extraction should be effected at temperatures ranging from about 70° to about 700° F., preferably from about 300° to about 500° F. As with regeneration via stripping, higher temperatures (within the ranges given above) will tend to increase the effectiveness of the solvent in displacing the adsorbate if the heat of adsorption of the solvent is lower than that of the contaminants. The pressure during regeneration is not critical and will normally vary within the ranges given for stripping. Similarly, the contact or residence time required need only be that sufficient to obtain a regenerated slurry. Thus, the contact time may vary from a few minutes to 2 hours or more. Typically, it will range from 5 to about 30 minutes.

Regeneration solvent plus desorbed contaminants may then be removed from the zone 30 via line 34 and passed into separation zone 38 (say a fractionation zone) wherein said solvent is recovered overhead in line 40 and the desorbed contaminants recovered in line 42, assuming the solvent boils at a lower temperature than the impurities.

The regenerated slurry thus removed from regeneration zone 30 via line 36 is then comingled with any makeup powdered carbonaceous adsorbent and/or hydrocarbon solvent which may be added through line 44. The combined stream of makeup and regenerated powdered activated carbon is then passed into the lower portion of contacting zone 22 via line 24 in order to achieve a continuous process.

The equipment employed during adsorption and regeneration is conventional and does not, per se, form a part of the present invention. As such, the equipment most suitable for a specific application can be readily selected by one skilled in the art. In addition, the materials of construction for the practice of the present invention are also conventional.

The invention will be further understood by reference to the following examples which are not intended to unduly restrict the limits of the claims appended hereto.

EXAMPLE 1—EFFECTIVENESS OF VARIOUS HYDROCARBON SOLVENTS IN ADSORBING PHENOL FROM WATER

The effectiveness of hydrocarbon solvents of different branchiness for slurrying powdered activated carbon were compared using a model waste water containing 4000 wppm phenol initially. Three cubic centimeters of water were shaken for five days with 0.25 g of commercial Hydrodarco H powder carbon slurried in 2.0 cubic centimeters of different hydrocarbons. The initial and final phenol concentrations in the water were determined by gas chromatography. Samples of water containing phenol were injected into a Perkin Elmer 900 gas chromatograph with a Porapak Q column at 250° F. and a thermal conductivity detector. The results obtained are shown in Table 4:

TABLE 4

| Hydrocarbon Solvent | Toluene | t-butyl-benzene | 2,2,4-tri-methylpen-tane |
|---|---|---|---|
| Final phenol concen- | 1,250 | 190 | 120 |

TABLE 4-continued

| Hydrocarbon Solvent | Toluene | t-butyl-benzene | 2,2,4-tri-methylpen-tane |
|---|---|---|---|
| tration in treated water, wppm | | | |
| Percent phenol removal attributed to | | | |
| adsorption on carbon | ~44 | ~57 | ~98 |
| dissolution in hydrocarbon solvent | ~56 | ~43 | ~2 |

These results indicate that phenol reduction is highest for the branchiest hydrocarbon tested, 2,2,4-trimethylpentane. The ratio of phenol adsorbed to phenol dissolved also increases with increasing hydrocarbon branchiness.

EXAMPLE 2—EQUILIBRIUM ISOTHERMS FOR ETHYLBENZOATE ADSORPTION FROM WATER

Figure 2:
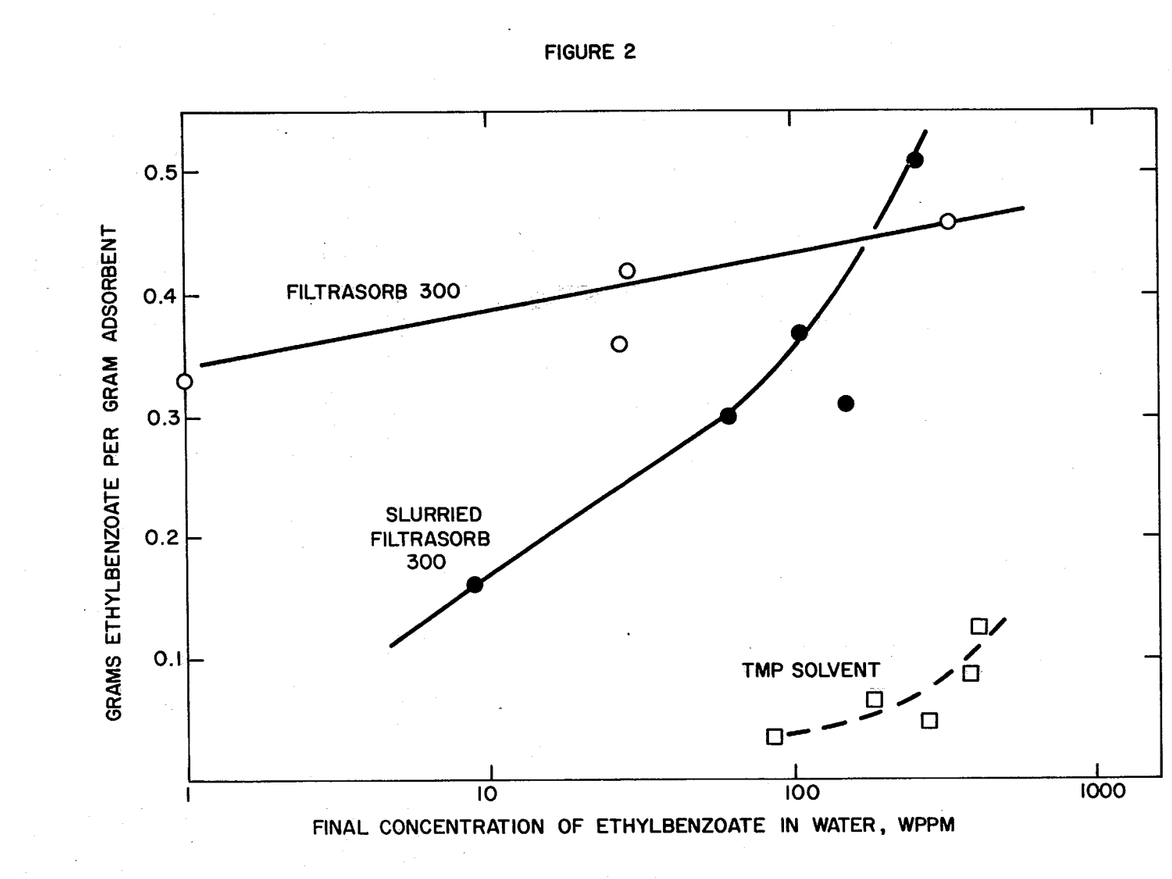
FIG. 2 illustrates equilibrium isotherms for ethylbenzoate adsorption from water using powdered activated carbon.

Equilibrium isotherms for powder carbons and slurried powder carbons were measured at room temperature (about 20° C.) for model waste waters formed from distilled water and ethylbenzoate in initial concentrations ranging between 10 and 10,000 wppm. The isotherms were obtained by shaking the model waste water with carbon or slurried carbon for 5 days, and measuring the amount of contaminant removed from the water using gas chromatography as in Example 1. The hydrocarbon solvent employed to form the slurry was 2,2,4-trimethylpentane. Granular Filtrasorb 300 activated carbon (having a surface area of 900 square meters per gram and a pore volume of 0.51 cubic centimeters per gram) was ground to obtain the 20/40 Tyler screen mesh fraction employed in the studies. The results of these experiments are shown in FIG. 2.

This example shows that the capacity of carbon for ethylbenzoate adsorption from water is not appreciably reduced by slurrying the carbon in a branchy hydrocarbon solvent.

EXAMPLE 3—KINETICS OF ETHYLBENZOATE ADSORPTION FROM WATER

A series of experiments were conducted to determine the rate of adsorption of ethylbenzoate from distilled water using the following adsorbents:
- 0.4 grams granular Filtrasorb 300 (6/8 Tyler screen mesh having a surface area of 900 square meters per gram and a pore volume of 0.5 cubic centimeters per gram).
- 0.4 grams powder Filtrasorb 300 (20/40 Tyler screen mesh having a surface area of 920 square meters per gram and a pore volume of 0.51 cubic centimeters per gram).
- powder Filtrasorb 300 (20/40 mesh) slurried with 2,2,4-trimethylpentane (TMP).
- solvent extraction with 2.0 cc of 2,2,4-trimethylpentane (no carbon present).

The waste water was formed from 150 cc water and 690 wppm ethylbenzoate. The slurries were formed from 0.4 g carbon and 2 cc of 2,2,4-trimethylpentane. This corresponded to about 22.2 wt. % carbon in the slurry.

Figure 3:
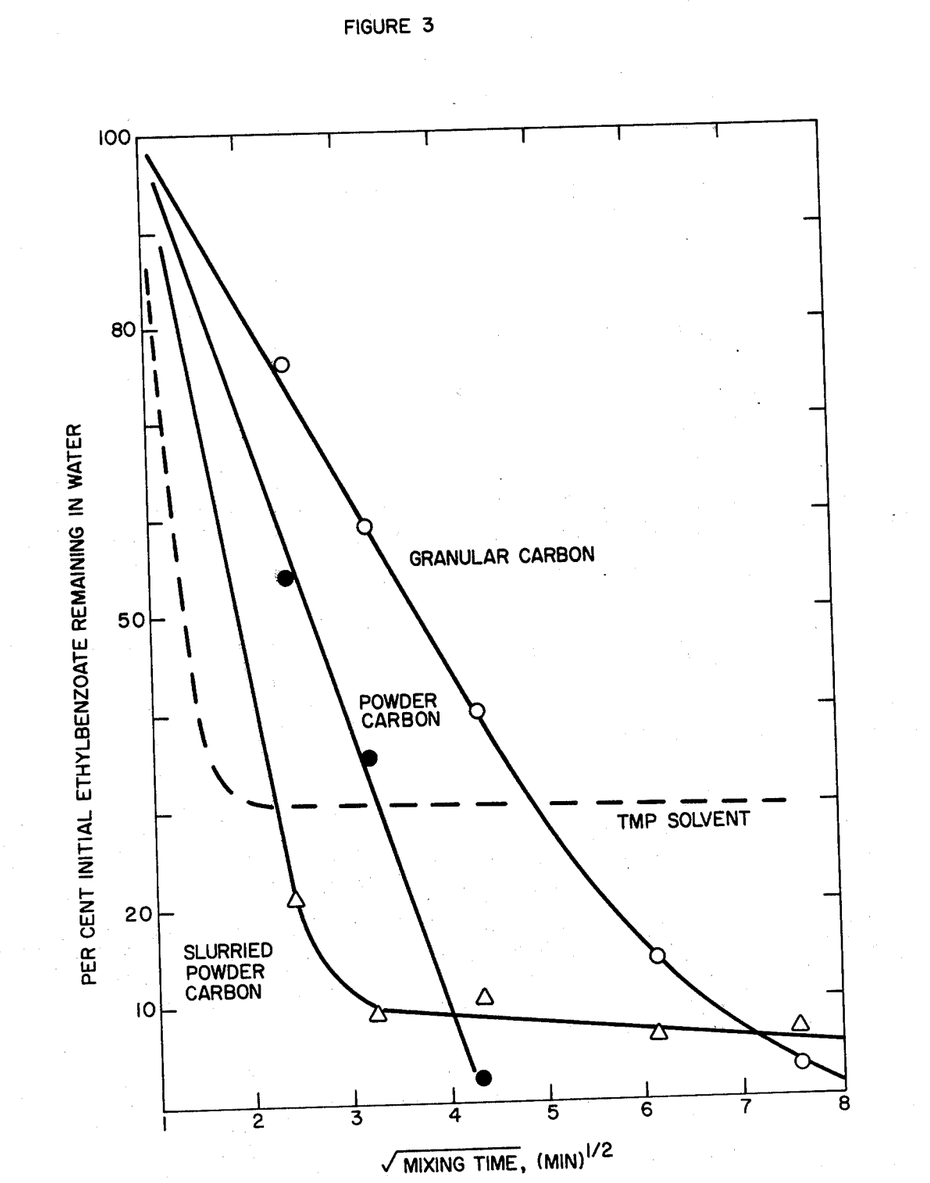
FIG. 3 illustrates the rate of adsorption of ethylbenzoate from water using powdered activated carbon.

The experiments were carried out at 20° C. in a batch, stirred reactor. The reactor was a 2 7/16 inch I.D. glass vessel with three vertical baffles stirred with a flat blade turbine impeller. Removal of ethylbenzoate from the water phase was measured by gas chromatography as a function of stirring time until equilibrium was reached (about 5 days). The results of the tests are shown in FIG. 3.

As shown in the Figure, slurried powder carbon shows the fastest removal rate, about 90 percent removal being achieved in about 4 minutes. Powder carbon alone gives 90 percent removal in 9 minutes, while granular carbon takes about 30 minutes to effect the same removal. Removal rate with the solvent alone is very fast, but the extent of removal is limited. Thus, this example shows that the rate of ethylbenzoate adsorption from water by slurried powder carbon is at least as fast as the adsorption rate on powdered carbon. In this particular example, the hydrocarbon solvent has enhanced the adsorption rate.

EXAMPLE 4—EQUILIBRIUM ISOTHERMS FOR PHENOL ADSORPTION FROM WATER

Figure 4:
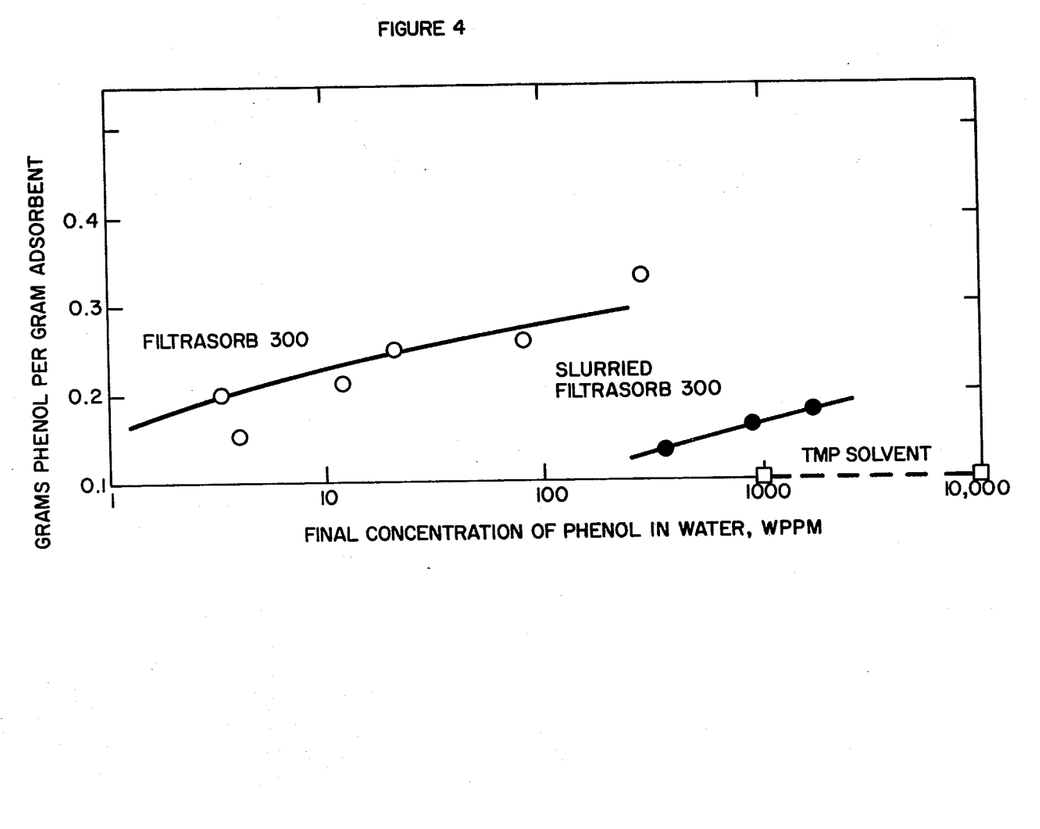
FIG. 4 illustrates equilibrium isotherms for phenol adsorption from water using powdered activated carbon.

Following the procedure and using the adsorbents of Example 2, equilibrium isotherms were measured for a model waste water formed from distilled water and phenol present in initial concentrations ranging between 10 and 10,000 wppm. The results are shown in FIG. 4.

The results indicate that addition of powdered carbon to the branchy hydrocarbon solvent increases capacity for phenol compared to branchy hydrocarbon alone.

EXAMPLE 5—KINETICS OF PHENOL ADSORPTION FROM WATER

Figure 5:
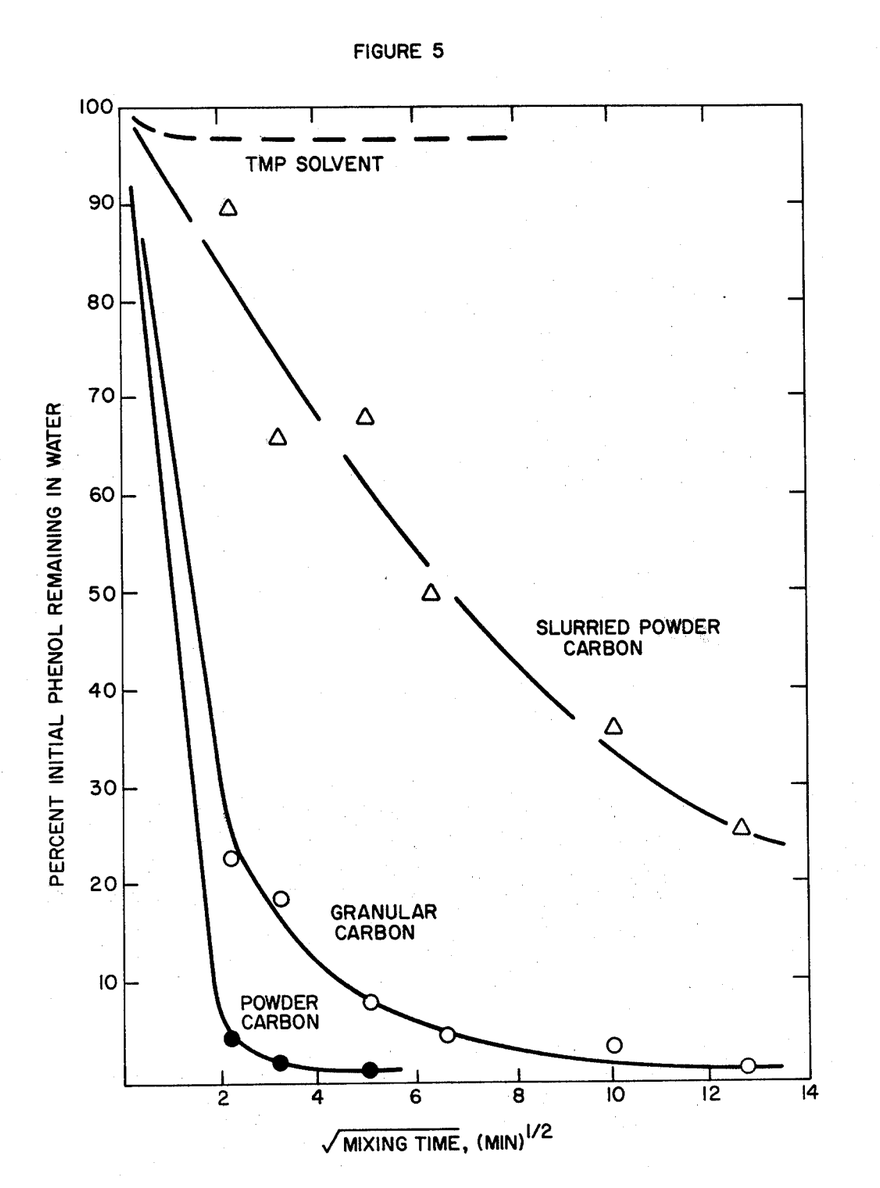
FIG. 5 illustrates the rate of adsorption of phenol from water using powdered activated carbon.

Following the procedure and using the adsorbents of Example 3, a series of experiments were conducted to determine the rate of adsorption of phenol from distilled water. The waste water was formed from 150 cc water containing 2,000 wppm phenol initially. The slurries were formed from 3.0 g carbon and 15 cc of 2,2,4-trimethylpentane. This corresponded to about 22.2 wt. % carbon in the slurry. The results are shown in FIG. 5.

This experiment shows that while phenol is adsorbed by the slurried carbon, the rate of adsorption is lower than that obtained with granular carbon. This is believed due to the low solubility of phenol in 2,2,4-trimethylpintane. The solvent alone gives less than 5% phenol removal.

EXAMPLE 6—ADDITIONAL EQUILIBRIUM ISOTHERMS FOR ETHYLBENZOATE ADSORPTION FROM WATER

Figure 6:
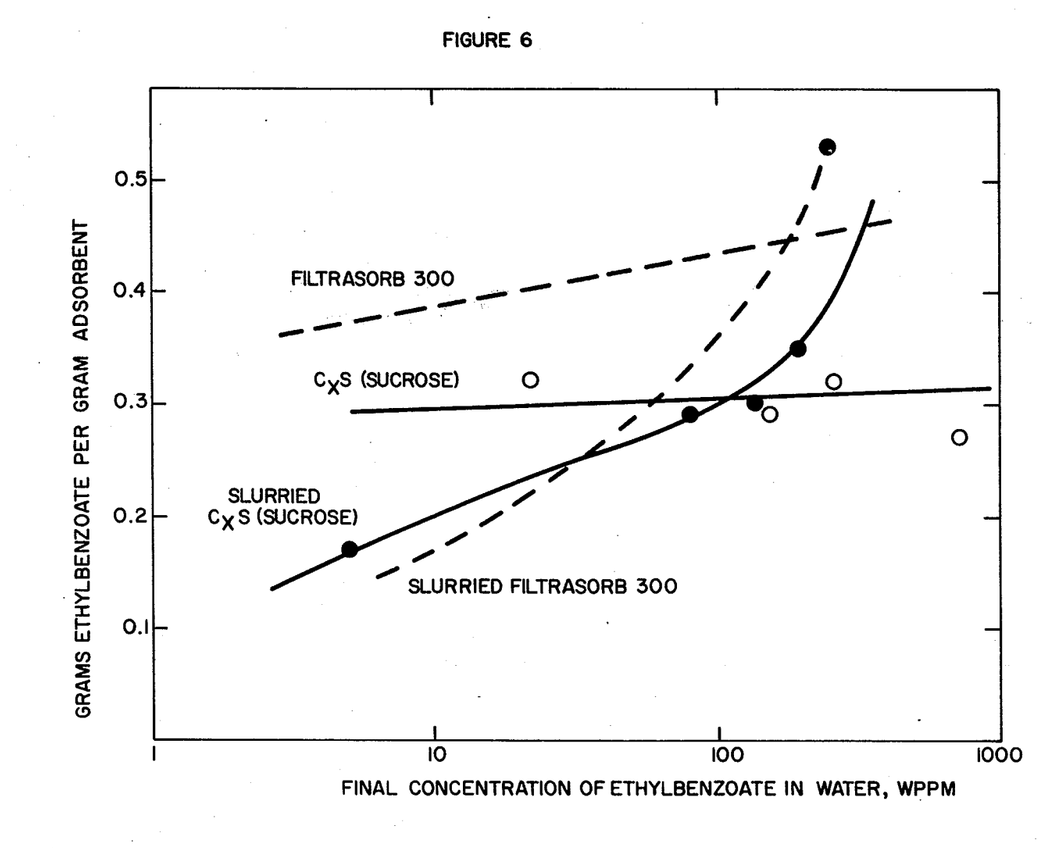
FIG. 6 illustrates equilibrium isotherms for ethylbenzoate adsorption from water using powdered nonstoichiometric carbon-sulfur compounds.

This example is similar to Example 2, except that the powdered adsorbent in the slurry is a nonstoichiometric carbon-sulfur compound made from sucrose char, $C_xS$ (sucrose), instead of Filtrasorb 300. The $C_xS$ (sucrose) had a surface area of 600 square meters per gram and a pore volume of 0.29 cubic centimeters per gram and a particle size of less than 300 mesh. The equilibrium isotherms, measured in the same way as those of Example 2, for ethylbenzoate adsorption from water by $C_xS$ (sucrose) and $C_xS$ (sucrose) slurried in 2,2,4-trimethylpentane are shown in FIG. 6. The corresponding isotherms from FIG. 2 for Filtrasorb 300 are shown (dashed lines) for comparison.

This example shows that slurried $C_xS$ (sucrose) is equivalent to slurried Filtrasorb 300 in capacity for ethylbenzoate adsorption from water even though the $C_xS$ (sucrose) sample used has a lower surface area and pore volume than Filtrasorb 300.

EXAMPLE 7—ADDITIONAL KINETICS OF ETHYLBENZOATE ADSORPTION FROM WATER

Figure 7:
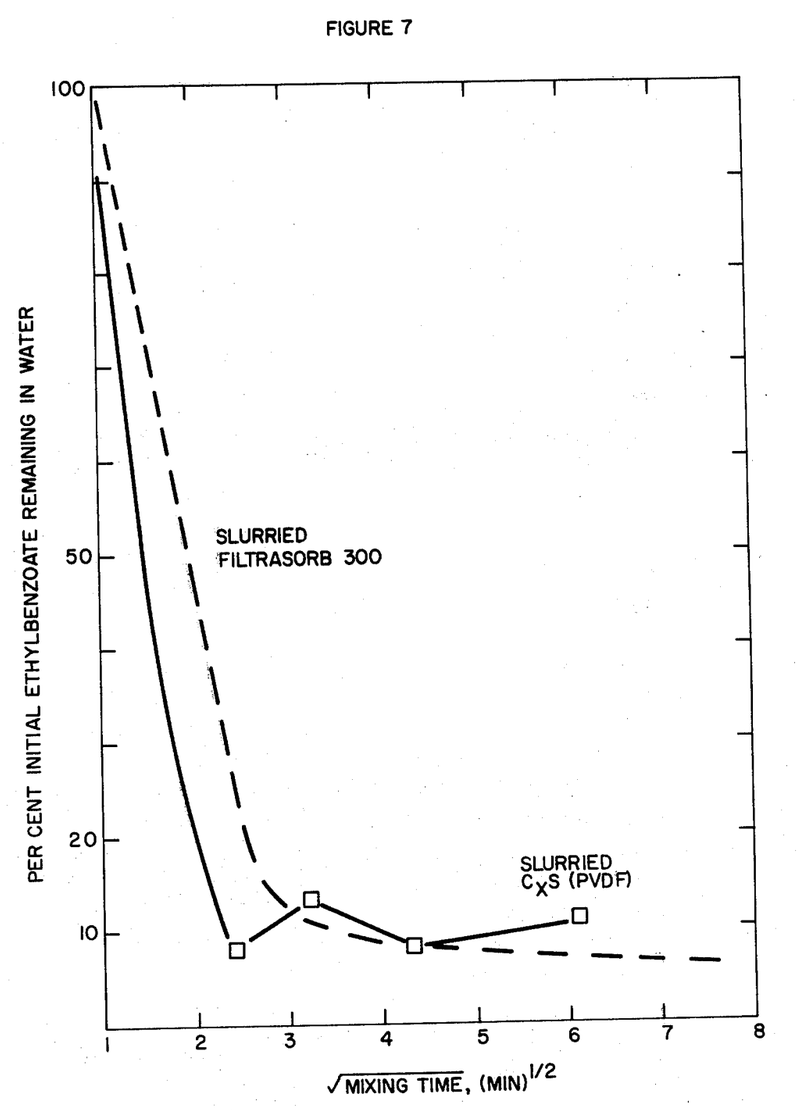
FIG. 7 illustrates the rate of adsorption of ethylbenzoate from water using powdered nonstoichiometric carbon-sulfur compounds.

This example is similar to Example 3, except that the powdered adsorbent in the slurry is nonstoichiometric carbon-sulfur compound made from polyvinylidene difluoride char, $C_xS$ (PVDF). The $C_xS$ (PVDF) had a surface area of 800 square meters per gram, a pore volume of 0.5 cubic centimeters per gram, and a particle size of less than 300 mesh. The rate of ethylbenzoate adsorption from the water phase into a slurried $C_xS$ (PVDF) was measured in the manner described in Example 2. The result is shown in FIG. 7 along with the corresponding result from FIG. 5 using slurried Filtrasorb 300.

This example shows that slurried $C_xS$ (PVDF) is substantially equivalent to slurried Filtrasorb 300 in rate of adsorption of ethylbenzoate from water, despite its slightly lower surface area and pore volume. Furthermore, these slurries of $C_xS$ (PVDF) were particularly stable, even with a very fine particle size fraction of $C_xS$ (PVDF) of minus 300 mesh.

EXAMPLE 8—ADDITIONAL EQUILIBRIUM ISOTHERMS FOR PHENOL ADSORPTION FROM WATER

Figure 8:
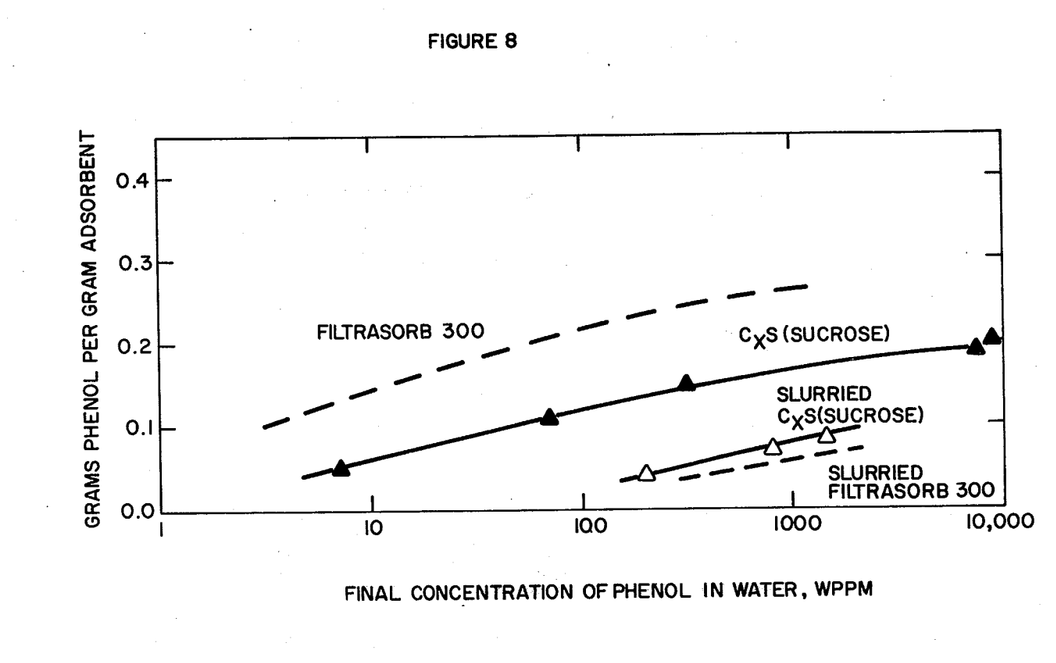
FIG. 8 illustrates equilibrium isotherms for phenol adsorption from water using powdered nonstoichiometric carbon-sulfur compounds.

This example is similar to the phenol equilibrium capacity of Example 4 except that the powdered adsorbent in the slurry is nonstoichiometric carbon-sulfur compound made from sucrose char, $C_xS$ (sucrose) as employed in Example 6. The phenol adsorption isotherm was measured in the way described in Example 4. The results is shown in FIG. 8.

This example shows that slurried $C_xS$ (sucrose) has a slightly better adsorption capacity for phenol from water than has slurried Filtrasorb 300, even though the $C_xS$ (sucrose) sample has a lower surface area and pore volume.

It should be noted that regeneration of the adsorbent by either of the methods described herein enables recovery of the adsorbate as a by-product stream. In addition, the particular regeneration methods described above can be employed to produce a concentrated stream of materials that were present initially in the waste water in only dilute concentrations.

What is claimed is:

1. In a composition comprising a slurry of powdered carbonaceous adsorbent in a liquid hydrocarbon solvent having a Miscibility Number of at least 25, the improvement which comprises said liquid hydrocarbon being a branched hydrocarbon and wherein said powdered carbonaceous adsorbent is a nonstoichiometric carbon-sulfur compound of the formula $C_xS$ where x ranges from about 10 to about 4.

2. A process for removing dissolved organic contaminants from waste water which comprises:
    (a) contacting said waste water in a contacting zone with a slurry comprising a powdered carbonaceous adsorbent in a branched hydrocarbon solvent having a Miscibility Number of at least 25; and
    (b) withdrawing water from said contacting zone that is reduced in said organic contaminants.

3. The process of claim 2 wherein said slurry comprises from about 10 to about 50 wt. % of said powdered carbonaceous adsorbent based on total weight of the slurry.

4. The process of claim 2 wherein said powdered carbonaceous adsorbent has a surface area of at least 300 square meters per gram and a pore volume of at least 0.2 cubic centimeters per gram.

5. The process of claim 2 wherein the temperature during said contacting ranges from about 40° to about 200° F.

6. The process of claim 2 wherein said powdered carbonaceous adsorbent is a nonstoichiometric carbon-sulfur compound of the formula $C_xS$ where x ranges from about 50 to about 4.

7. The process of claim 2 wherein said hydrocarbon solvent comprises at least one tri-substituted carbon atom, at least one tetra-substituted carbon atom or mixtures thereof.

8. A process for removing suspended solids and organic contaminants from waste water which comprises:
   (a) pretreating said waste water in a primary separation zone wherein a major portion of said suspended solids are removed therefrom;
   (b) contacting said pretreated waste water with a slurry comprising a powdered carbonaceous adsorbent in a branched hydrocarbon solvent having a Miscibility Number of at least 25 and
   (c) recovering water effluent that is reduced in suspended solids and said organic contaminants.

9. The process of claim 8 wherein said slurry comprises from about 10 to about 50 wt. % of said powdered carbonaceous adsorbent based on total weight of the slurry.

10. The process of claim 8 wherein said powdered carbonaceous adsorbent has a surface area of at least 300 square meters per gram and a pore volume of at least 0.2 cubic centimeters per gram.

11. The process of claim 8 wherein the temperature during said contacting ranges from about 40° to about 200° F.

12. The process of claim 8 wherein said powdered carbonaceous adsorbent is a nonstoichiometric carbon-sulfur compound of the formula $C_xS$ where x ranges from about 50 to about 4.

13. The process of claim 8 wherein said hydrocarbon solvent comprises at least one tri-substituted carbon atom, at least one tetra-substituted carbon atom or mixtures thereof.

14. A process for removing dissolved organic contaminants from waste water which comprises:
   (a) contacting said waste water with a slurry comprising a powdered carbonaceous adsorbent in a branched hydrocarbon solvent having a Miscibility Number of at least 25, thereby forming a water effluent that is reduced in organic contaminants and a slurry comprising said hydrocarbon solvent and powdered carbonaceous adsorbent having reduced adsorptive capacity;
   (b) recovering said water effluent; and
   (c) regenerating the slurry formed in (a), thereby forming a slurry containing powdered carbonaceous adsorbent having a greater capacity to adsorb organic contaminants than that possessed by the slurry formed in (a).

15. The process of claim 14 wherein the contacting of (a) is conducted at a temperature ranging from about 40° to about 200° F.

16. The process of claim 14 wherein the slurry of (a) comprises from about 10 to about 50 wt. % of said powdered carbonaceous adsorbent based on total weight of the slurry.

17. The process of claim 14 wherein the powdered carbonaceous adsorbent of (a) has a surface area of at least 300 square meters per gram and a pore volume of at least 0.2 cubic centimeters per gram.

18. The process of claim 14 wherein said powdered carbonaceous adsorbent is a nonstoichiometric carbon-sulfur compound of the formula $C_xS$ where x ranges from about 50 to about 4.

19. The process of claim 14 wherein said hydrocarbon carbon solvent comprises at least one tr-substituted carbon atom, at least one tetra-substituted carbon atom or mixtures thereof.

20. The process of claim 14 wherein the regeneration in (c) is effected by contact with a stripping gas.

21. The process of claim 20 wherein the regeneration in (c) is effected at a temperature ranging from about 70° to about 200° F.

22. The process of claim 20 wherein the regeneration in (c) is effected at a temperature ranging from about 300° to about 700° F.

23. The process of claim 20 wherein the stripping gas contains steam.

24. The process of claim 14 wherein the regeneration in (c) is effected by contact with a liquid solvent having a Miscibility Number of 5 or less.

25. The process of claim 24 wherein the regeneration of (c) is effected at a temperature ranging from about 70° to about 700° F.

26. The process of claim 24 wherein the temperature during said regeneration ranges from about 300° to about 500° F.

* * * * *